Oct. 9, 1951 R. C. PULLON 2,570,483
THREAD CUTTING TOOL
Filed May 7, 1948
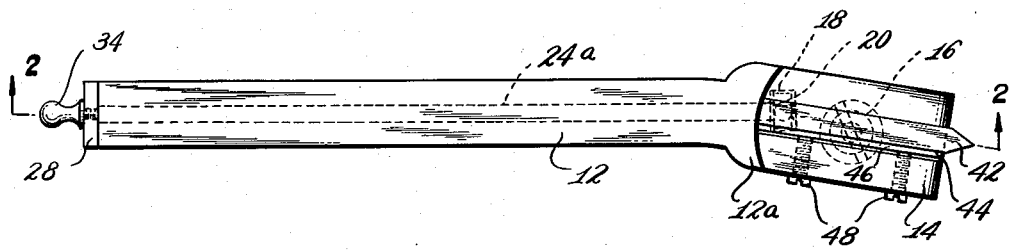
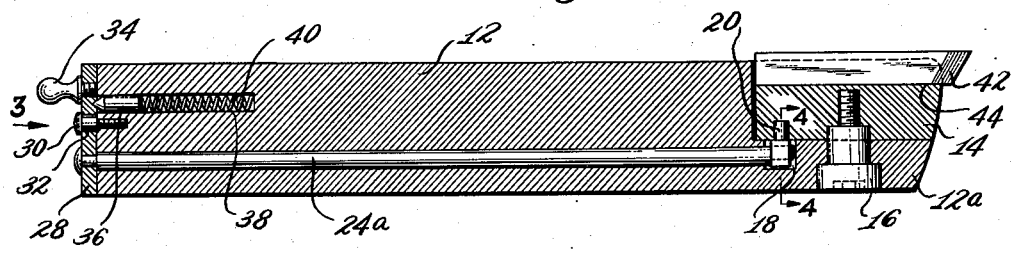
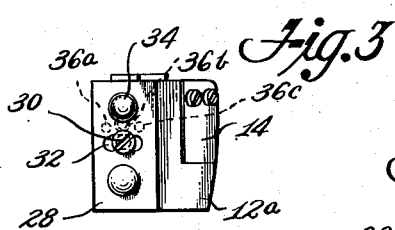
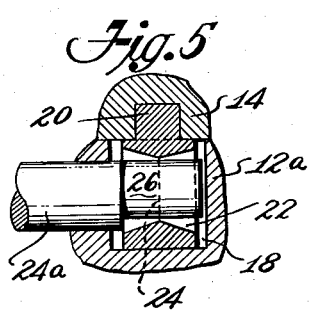
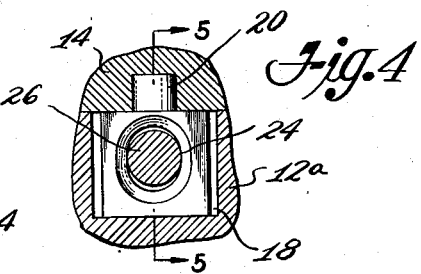
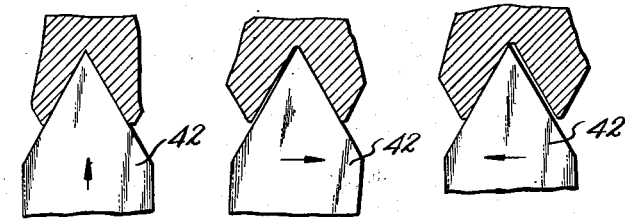
INVENTOR.
RUSSELL C. PULLON
BY
Luther Mack
Attorney Patented Oct. 9, 1951

2,570,483

UNITED STATES PATENT OFFICE 2,570,483

THREAD-CUTTING TOOL

Russell C. Pullon, Los Angeles, Calif., assignor to Mimita A. Cogliandro, Los Angeles, Calif.

Application May 7, 1948, Serial No. 25,727

4 Claims. (Cl. 29—98)

My invention relates to improvements in metal working machine cutting tools, and particularly to tools for cutting V threads either by traversing the work and tool relatively to one another as when forming a rack or by feeding the tool into a rotated bar while moving the tool axially along the work to cut a continuous helical thread thereon. The invention will be specifically described with relation to this latter operation by way of example only since the invention is not limited to this application.

In cutting V screw threads, for instance, the cutting tool is subject to much vibration due to the cut being made on both edges of the V, necessitating repeated cuts to obtain a satisfactorily fine finish, and repeated adjustment of the tool holder. It is an object of my invention to provide a cutting tool by which a fine finish cut may be given by adjustment of the cutting tool without requiring adjustment of the tool holder.

It is another object of my invention to provide a V thread screw cutting tool which can be used to give a finish cut after the full depth has been cut by adjusting the cutting tool to cut along one edge while relieving the pressure on the other edge of the tool and then similarly adjusting the other edge of the cutting tool without changing the adjustment of the tool as a whole.

Still another object of my invention is to provide a lathe tool having a cutting element which may be adjusted accurately between predetermined limits without adjustment of the tool as a whole, the construction of the tool being simple and rugged and therefore long-wearing and satisfactory in service.

Still further objects and features of my invention will hereinafter appear from the following description taken in conjunction with the accompanying drawings in which is illustrated a preferred form of my invention but it is to be understood that various changes and modifications of parts may be made in the described form of the invention without departing from the scope of the invention as intended to be defined by the appended claims.

In the drawings:

Fig. 1 is a plan view of the tool;

Fig. 2 is a cross section on the line 2—2 of Fig. 1;

Fig. 3 is an end elevation of the tool looking in the direction of arrow 3 in Fig. 2;

Fig. 4 is a fragmentary cross section on the line 4—4 of Fig. 2 drawn to an enlarged scale;

Fig. 5 is a cross section on the line 5—5 of Fig. 4;

Fig. 6 is a fragmentary detail showing the cutter fully entered and centered in the material;

Fig. 7 is a fragmentary detail showing the cutter adjusted to give a finish cut to the right hand face of the thread;

Fig. 8 is a similar view to Fig. 7, but showing the cutter adjusted to give a finish cut to the left hand face of the thread; and Fig. 9 is a view similar to Figs. 7 and 8, but showing the cutter advanced to finish off the bottom of the thread.

In the drawings the numeral 12 indicates the shank rectangular in cross section of the tool which is preferably provided with an offset head 12a cut away to receive a cutter holding block 14 pivotally mounted on the head by a shouldered stud 16. The head is also bored at 18 to receive a stud 20 projecting from the underside of block 14 between pivot 16 and its rearward end. Stud 16 is machined to provide an opening 22 having parallel vertical edges, and the opening is chamfered to produce a substantially straight line engaging surface 24.

The shank of the tool is drilled throughout its length and a rod 24 is accurately journalled in the drilled hole with its forward end extending into the opening of stud 20. The forward end of the rod is ground to provide a circular cam 26 off center by the depth of finish cut to be given, which may be of the order of .001". The cam will engage with the straight line surface 24 of the stud 20 as shown in Fig. 5. The rearward end of rod 24 is immovably secured to a small strip 28 held for rocking movement on a stud 30 screwed into the end of the tool shank, strip 28 having an accurate opening 32 formed therein to permit of a limited rocking movement relative to the stud 30, the head of which abuts the outer surface of strip 28 and holds rod 24 against removal. A knob 34 is secured to strip 30 forming a crank therewith by which strip 28 and rod 24 may be rocked about the longitudinal axis of the latter.

Three accurately positioned conical depressions 36a, 36b, 36c are formed on the inner face of strip 28 at the same distance from the axis of rod 24, depression 36b being placed in the vertical plane in which the axis of rod 24 is located, while depressions 36a and 36b are located at points corresponding to the maximum off-center position of the cam 26 to left and right, respectively, which will throw the right and left cutting edges of the tool respectively against the work.

A conical ended detent 36 is mounted in a hole 38 drilled in the shank 12 with its axis at the same distance from the axis of rod 24 as the spacing of conical depressions 36a, 36b, and 36c from the axis of the rod vertically above and parallel to the axis of the rod 24 relatively stiff helical spring 40 is positioned under compression between the inner end of the detent and the end of the hold 38. The arcuate opening 32 is long enough to permit strip 28 to be rocked sufficiently to enable detent 36 to fully enter depressions 36a, 36b and 36c and hold the strip in the exact predetermined limit positions.

The cutting bit 42 may be mounted in any suitable manner in head 14, as shown. The head is provided with a groove 44 somewhat wider than the bit 42, a wear plate 46 being positioned between one side of the groove and of the bit and the bit is clamped in position by threaded studs 48 engaging through threaded holes in the head against the wear plate. Both the block 14 and cutter bit are preferably given a radius at the rear and fit with a similar radius machined at the forward end of the shank in order to secure support therefrom.

In use, the cutting tool is given a contour such that after the finishing cuts have been made the lateral faces of the thread will have been cut to accurate dimensions and a final cut is made if necessary by feeding the tool forward very slightly to remove the minute flat made at the root of the thread by the lateral adjustment of the cutter.

I claim:

1. A thread cutting tool comprising: a shank; a tool holder pivotally mounted at one end of the shank for displacement to an equal extent on opposite sides of a center line; a rod extending through a longitudinal bore in said shank from the end thereof; a cam mounted at the opposite end of said rod and engaging with said tool holder at a point spaced from the pivotal axis thereof, rocking of said rod being effective to cause said cam to pivotally move said tool holder; means mounted at the rear end of the rod by which it may be rocked about its longitudinal axis; and means for limiting the extent of the movement of said latter means.

2. A thread cutting tool comprising: a shank; a tool holder pivotally mounted at one end of the shank for displacement to an equal extent on opposite sides of a center line; a rod extending through a longitudinal bore in said shank from the end thereof; a cam mounted on the opposite end of said rod; a pin depending from said tool holder into a recess in the shank, said pin being apertured to receive said cam; means mounted at the rear end of the rod by which it may be rocked about its longitudinal axis; and means for limiting the extent of the movement of said latter means to a predetermined position.

3. A thread cutting tool comprising: a shank; a tool holder pivotally mounted at one end of the shank for displacement to an equal extent on opposite sides of a center line; a rod extending through a longitudinal bore in the shank from the end thereof a cam mounted at the opposite end of said rod and engaging with said tool holder at a point spaced from the pivotal axis thereof, rocking of said rod being effective to cause said cam to pivotally move said tool holder; a plate secured to the end of said rod; means holding said plate for movement in the plane of the vertical end of the shank and for limiting the extent of said movement; a handle secured to said plate by which the latter may be moved to rock said rod about its longitudinal axis; and means for holding said plate in a central position, and in predetermined positions located to each side of said central position.

4. A thread cutting tool as set forth in claim 3, and in which the means for holding said plate in position comprise a central conical depression in the inner face of said plate and a conical depression on each side of said central depression and equally spaced therefrom; a conical end plunger mounted in a bore in said shank on the vertical center line thereof, and a spring urging said plunger into engagement with whichever one of said recesses is aligned with the plunger by operation of the handle.

RUSSELL C. PULLON.

REFERENCES CITED

The following references are of record in the file of this patent:

UNITED STATES PATENTS

| Number | Name | Date |
|---|---|---|
| 800,972 | Black | Oct. 3, 1905 |
| 847,586 | Kelly | Mar. 19, 1907 |
| 936,249 | Markel | Oct. 5, 1909 |
| 1,488,521 | Woodward | Apr. 1, 1924 |
| 1,666,109 | Sheberashenko | Apr. 17, 1928 |
| 1,991,494 | Dempsey | Feb. 19, 1935 |

FOREIGN PATENTS

| Number | Country | Date |
|---|---|---|
| 93,031 | Switzerland | Mar. 12, 1919 |